(12) United States Patent
Davis

(10) Patent No.: US 7,139,795 B2
(45) Date of Patent: Nov. 21, 2006

(54) SYSTEM FOR SHARING A BROWSER SESSION BETWEEN TWO CLIENTS WITH ONE OF THE CLIENTS ON SERVER SIDE OF A CLIENT SERVER COMMUNICATION PROTOCOL

(75) Inventor: John M. Davis, Phoenix, AR (US)

(73) Assignee: Intel Corporation, Santa Clara, CA (US)

( * ) Notice: Subject to any disclaimer, the term of this patent is extended or adjusted under 35 U.S.C. 154(b) by 1210 days.

(21) Appl. No.: 09/785,918

(22) Filed: Feb. 17, 2001

(65) Prior Publication Data

US 2002/0116489 A1    Aug. 22, 2002

(51) Int. Cl.
*G06F 15/16* (2006.01)
(52) U.S. Cl. ....................... 709/204; 709/224
(58) Field of Classification Search ................ 709/204, 709/205, 227, 249, 229, 224
See application file for complete search history.

(56) References Cited

U.S. PATENT DOCUMENTS

| | | | |
|---|---|---|---|
| 5,432,907 A * | 7/1995 | Picazo et al. | 709/249 |
| 5,809,250 A * | 9/1998 | Kisor | 709/227 |
| 6,295,551 B1 * | 9/2001 | Roberts et al. | 709/205 |
| 6,564,261 B1 * | 5/2003 | Gudjonsson et al. | 709/227 |
| 6,748,420 B1 * | 6/2004 | Quatrano et al. | 709/205 |
| 6,785,728 B1 * | 8/2004 | Schneider et al. | 709/229 |
| 6,877,027 B1 * | 4/2005 | Spencer et al. | 709/205 |
| 2002/0032731 A1 * | 3/2002 | Qian et al. | 709/204 |

OTHER PUBLICATIONS

John M. Davis, U.S. Appl. No. 09/652,432, filed Aug. 31, 2000, entitled "Assisting Users with Web Pages".

* cited by examiner

*Primary Examiner*—Le Hien Luu
(74) *Attorney, Agent, or Firm*—Trop, Pruner & Hu, P.C.

(57) ABSTRACT

A web session may be shared between two or more browser clients both viewing the same content on the same web content server. By providing a proxy device on the server side of the network, bandwidth may be utilized effectively. As one example, a help session may be initiated via a proxy device on the server side of the network. Session sharing may be provided with an additional server side browser. The server side browser may be manned by help desk personnel who may communicate with the user of a client browser at the same time both the user and the help desk personnel are viewing the same web page.

21 Claims, 4 Drawing Sheets

SYSTEM FOR SHARING A BROWSER SESSION BETWEEN TWO CLIENTS WITH ONE OF THE CLIENTS ON SERVER SIDE OF A CLIENT SERVER COMMUNICATION PROTOCOL

BACKGROUND

This invention relates generally to establishing web sessions.

A session is a data stream from a content server. Conventionally, a client, connected over a network such as the Internet, accesses web pages on a web server. The client does this by making a hypertext transfer protocol (HTTP) request to a server that responds with the requested information. As a result, a web session is established which conventionally is a private session between a single browser client user and the addressed web server.

Users may need help in connection with various web sites or web pages. Generally, when the user needs help, the user may operate a soft help button and receives, in effect, pre-prepared information. Alternatively, the user may contact the web site provider, for example, over a telephone or electronic mail link. In many cases, the web site provider has a large number of web pages and may be uncertain exactly which web page the user has concerns about. In many cases, the web site provider provides assistance to the web page user without viewing the web page or without a complete understanding of the precise nature of the user's problem.

The quality of the service provided and the amount of time needed to help the user may suffer because the web site provider may not have a clear understanding of the exact issue raised by the user. In some cases, the web site provider can attempt to work through the web pages starting from the home page to attempt to recreate the situation plaguing the user. However, in some cases, the user may not remember exactly how the user arrived at a given page. In other cases, it may take an extended amount of time for the web site provider to arrive at the same location in the web site currently creating the problem for the user.

Thus, the private nature of a web session between a client browser and the server may create problems. One instance of these problems arise with the provision of online help services because the help service provider may be unable to see what the user sees.

Other problems that arise from the private nature of web sessions include the inability of a plurality of users to communicate effectively while viewing a web page. Again, the private nature of the Internet access protocol generally limits the number of users that may participate in a given session.

Thus, there is a need for a way to share a particular web session among users.

BRIEF DESCRIPTION OF THE INVENTION

DETAILED DESCRIPTION

Figure 1:
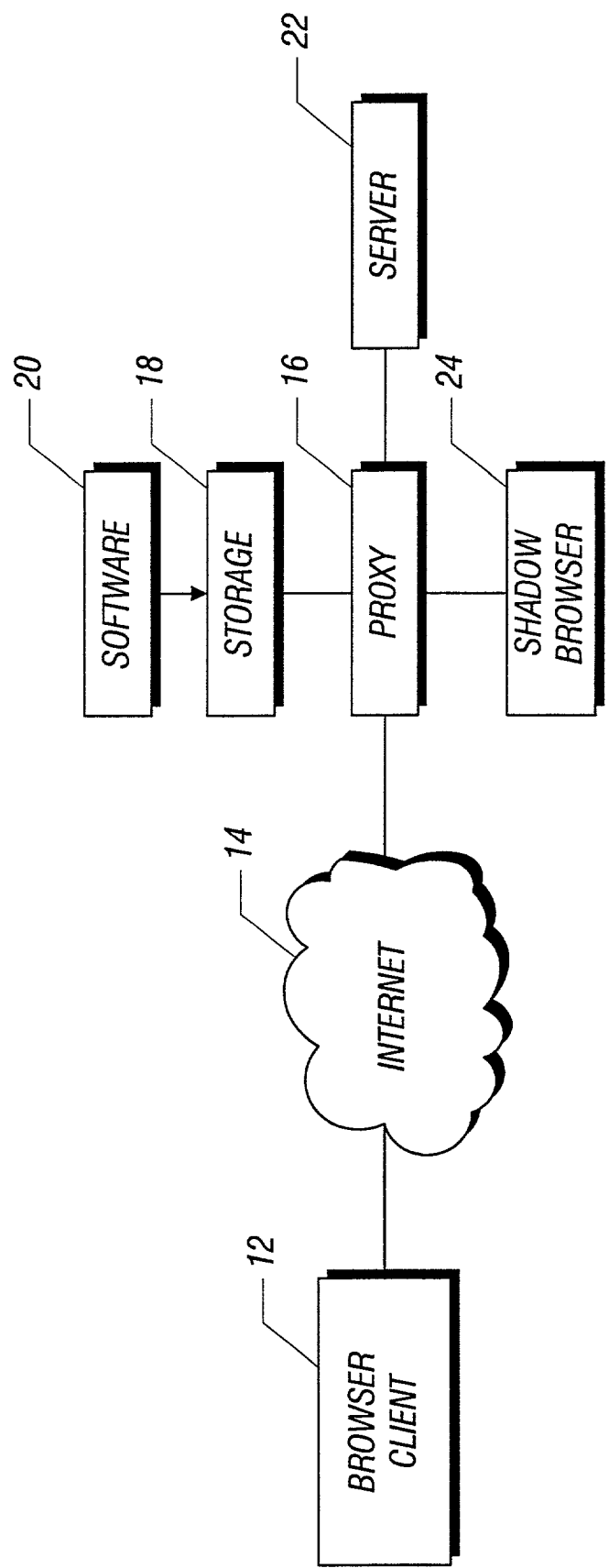
FIG. 1 is a schematic depiction of one embodiment of the present invention.

A network 10 for establishing a session may include a browser client 12 communicating over a network such as the Internet 14 with a web content server 22. The communication between the client 12 and server 22 may be via a proxy 16 which during normal communications is a completely transparent communication path. In other words, prior to the occurrence of a trigger event, the proxy 16 may do nothing, in one embodiment, other than to merely transfer communications between the client 12 and the server 22. Thus, a session may exist between the client 12 and the server 22 which is substantially unaffected by the proxy device 16.

The proxy device 16 may be a processor-based system in one embodiment of the present invention. Thus, the device 16 may include its own processor and may be coupled to a storage device 18. The storage device 18 may be any of a variety of known storage devices such as a hard disk drive or a flash memory, as two examples. Software 20, for controlling the operation of the proxy device 16, may be stored in the storage device 18. The proxy device 16 may include a proxy engine that will be described in more detail hereinafter. The proxy device 16 may be a dedicated use inbound proxy in one embodiment.

The proxy device 16 may be coupled to a shadow browser 24. The shadow browser 24 may be a client processor-based system in one embodiment.

The proxy device 16 and shadow browser 24 are on the server side of the client server communication protocol with respect to the network 14. Thus, the proxy device 16 and the shadow browser 24 may communicate through a relatively high bandwidth connection compared to the connection between the Internet 14 and the browser client 12.

Figure 2:
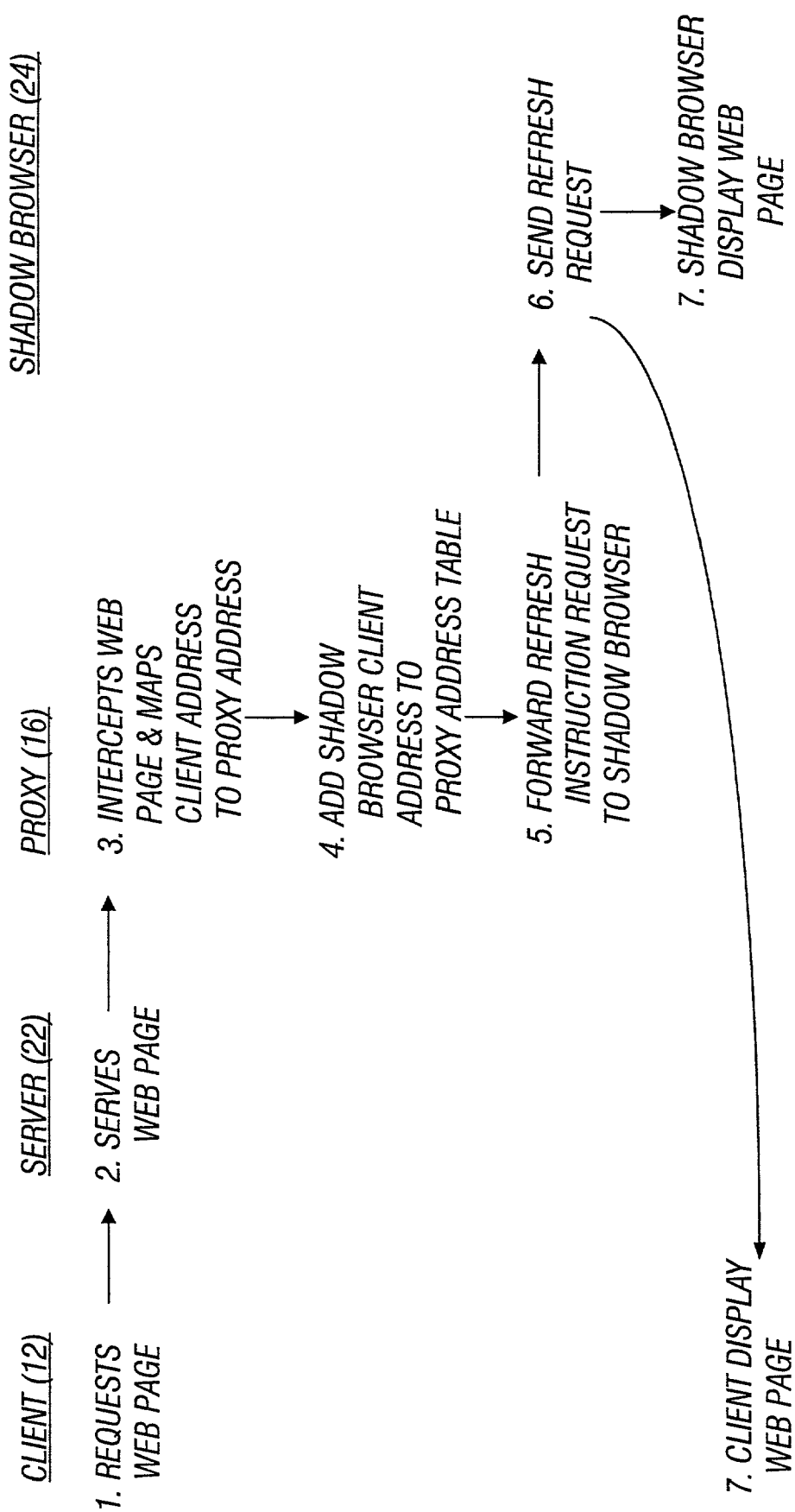
FIG. 2 is a chart showing a process in accordance with one embodiment of the present invention.

Turning next to FIG. 2, the client 12 may access an Internet web page by requesting the web page as indicated at 1. Thus, the client 12 requests the web page from the server 22, for example, by making a HTTP request that travels over the Internet 14. This request may pass unaffected through the proxy device 16 to the content web server 22. A result is returned from the web server 22 to the browser client 12 via the same logical route. In such case, the proxy device 16 has no affect on the web session which proceeds between the client 12 and the server 22.

However when a trigger occurs, the proxy device 16 intercepts the web page in the form of a data stream and maps the client browser address to a virtual proxy address as indicated at 3. The proxy device 16 also adds the shadow browser client address to a proxy address table for that session's address. The proxy device 16 may also forward the domain cookie information refresh instruction requests to a listener on the shadow browser client 24 as indicated at 5.

The shadow client browser 24 then sends a refresh request as indicated at 6. As a result, the shadow client browser 24 and client 12 both display the same web page. Optionally, a chat client session may be invoked between the various session participants which include the client 12, the server 22 and at least one shadow browser 24.

The trigger event to initiate the session sharing may be a request from the user invoked from code on the client 12. Alternatively, the trigger may be the result of an embedded web page function. For example, referring to FIG. 4, a help icon 65 may be maintained on the web page 60. When the user clicks on the help icon 65, a code may be generated which may be intercepted by the proxy device 16 to initiate session sharing. As still another example, the session sharing may be invoked via an automated call from the web content server 22. As one example, when the number of data entry errors detected by the server 22 exceeds a predetermined limit during a single web session, the proxy device 16 may be automatically triggered.

In one embodiment a secure transaction may be implemented, for example using a modified secure socket layer (SSL). SSL may be implemented in the proxy device 16 by renegotiating sessions between the proxy device 16 and the server 22 and between the proxy device 16 and the client 12, with the proxy device 16 translating for device 16-client 12 and device 16-server 22 transactions.

Where the proxy device 16 and server 12 have a trusted connection, translation may not be needed in device 16-server 22 transactions. In general the proxy device 16 needs a certificate with any server 22 it interacts with. Thus, a SSL proxy may be useful in some situations to negotiate sessions where a pre-existing relationship was not already established.

Figure 3:
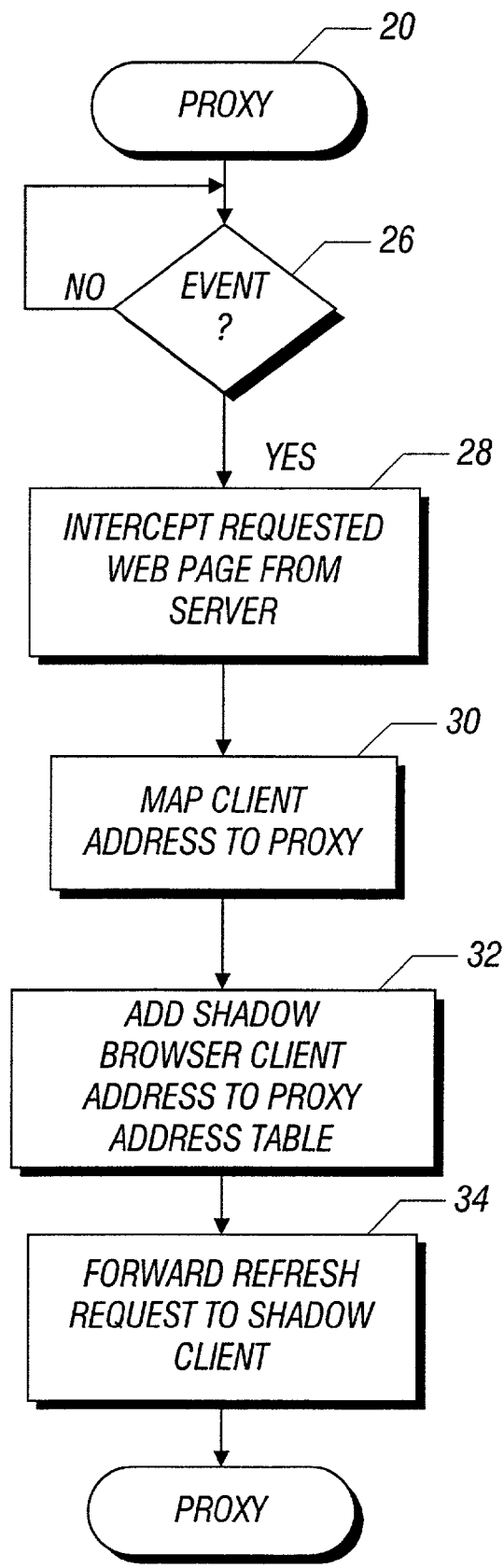
FIG. 3 is a flow chart for software on a proxy device in accordance with one embodiment of the present invention.

Referring to FIG. 3, the proxy software 20 stored on the proxy device 16 storage 18 begins by detecting the occurrence of an event as indicated at diamond 26 in one embodiment of the present invention. When an event is detected, the requested web page is intercepted from the web server 22. The client address is then mapped to the proxy device 16 as indicated in block 30. At this point, the server 22 believes it is communicating with the client 12 but instead is actually communicating with the proxy device 16. The proxy device 16 then communicates or establishes sessions with both the client 12 and one or more shadow browsers 24.

To implement multiple sessions, the shadow browser 24 address is added to a proxy address table as indicated in block 32. A refresh request is then forwarded to the shadow client as indicated in block 34. When the client 12 initiates the refresh request, the shadow browser 24 then displays the same web page displayed by the client 12.

As one example, a help session may be initiated. Help desk personnel, managing the shadow browser 24, see the same web page as the user of the client 12. The help desk personnel may thereby provide more effective assistance to the user. As still another application, one may invite registered shadow browser users into a shared browser session. Each member of the session may have the ability to navigate for the group among any desired web pages or by defining a view only status within the address mapping thereby enabling some active and other passive browser participants. A termination status setting may be set as well. As one example, a setting may determine whether the session is automatically terminated when the initiator leaves the session or when the last participating browser leaves the session.

By putting the device 16 which initiates the session sharing on the server side of the network 10, bandwidth may be conserved. This placement avoids encroaching on the more limited bandwidth constraints of the typical browser user when compared to remote control where client is just remoting software.

Figure 4:
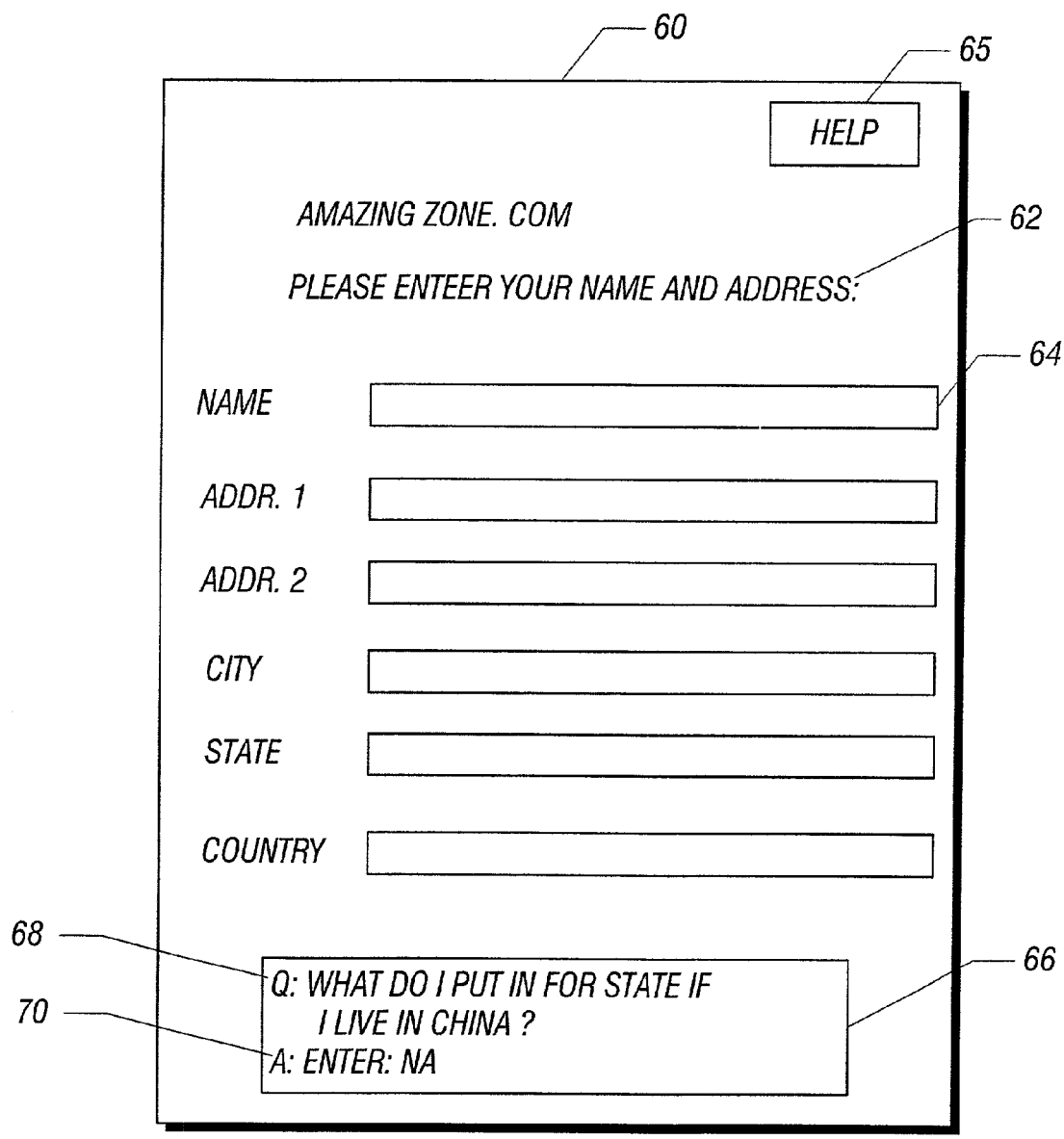
FIG. 4 is a screen display in accordance with one embodiment of the present invention.

Referring to FIG. 4, the web page 60 may include a variety of information 62 and 64 to be completed by the user. Once the shadow browser 24 is sharing the session with the client 12, a chat session may be initiated. For example, the user may ask a question 68 and the help desk personnel manning the shadow browser 24 may provide an answer, as indicated at 70, while viewing the same web page that the user is viewing.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    detecting an event at a server in a client server communication protocol; and
    upon detection of an event, sharing a browser session between at least two clients, one of said clients being on the server side of said client server communication protocol.

2. The method of claim 1 wherein the step of detecting an event includes detecting, at a server, an event generated on the client.

3. The method of claim 2 wherein the step of sharing a browser session includes intercepting a web page provided from a server to the client.

4. The method of claim 3 further including mapping a client address of the web page to a proxy.

5. The method of claim 4 further including enabling a proxy to provide the web page to a shadow browser client.

6. The method of claim 5 wherein the step of enabling the proxy to provide the web page to a shadow browser client includes forwarding a refresh request to the shadow browser client.

7. An article comprising a medium storing instructions that, if executed, enable a processor-based system to:
    detect an event at a server in a client server communication protocol; and
    upon detection of an event, share a browser session between at least two clients, one of said clients being on the server side of said client server communication protocol.

8. The article of claim 7 further storing instruction that, if executed, enable the processor-based system to detect, at a server, an event generated on the client.

9. The article of claim 8 further storing instructions that, if executed, enable the processor-based system to intercept a web page provided from a server to the client.

10. The article of claim 9 further storing instructions that, if executed, enable the processor-based system to map a client address of the web page to a proxy.

11. The article of claim 10 further storing instructions that, if executed, enable the processor-based system to enable a proxy to provide the web page to a shadow browser client.

12. The article of claim 11 further storing instructions that, if executed, enable the processor-based system to forward a refresh request to the shadow browser client.

13. A system comprising:
    a processor-based device; and
    a storage coupled to said device, said storage storing instructions that, if executed, enable the processor-based device to detect an event at a server in a client server communication protocol and upon the detection of an event, cause a browser session to be shared between at least two clients, one of said clients being on the server side of said client server communication protocol.

14. The system of claim 13 wherein said processor-based device is a proxy which may be transparent to communications passing between a browser client and a server through said proxy until an event is detected.

15. The system of claim 14 wherein in response to the detection of an event, said processor-based device causes a browser session to be shared between at least two clients.

16. The system of claim 13 adapted to be located on the server side of a network.

17. The system of claim 13 wherein said storage stores instructions that enable the processor-based device to intercept a web page provided from a server to a client.

18. The system of claim 17 wherein said storage stores instructions that enable the processor-based device to map a client address of the web page to a proxy.

19. The system of claim 18 wherein said storage stores instructions that enable the processor-based device to provide the web page to a shadow browser client.

20. The system of claim 19 wherein said storage stores instructions that enable the processor-based device to forward a refresh request to a shadow browser client.

21. The system of claim 13 wherein said storage stores instructions that enable the processor-based device to initiate session sharing over a network between a client on one side of the network and a server on the other side of the network and share the session with another client coupled on the server's side of the network.

* * * * *